US00RE50362E

(19) United States
(12) Reissued Patent
Porteros De Luz

(10) Patent Number: US RE50,362 E
(45) Date of Reissued Patent: Apr. 8, 2025

(54) HIP THRUSTING EXERCISE MACHINE

(71) Applicant: Veronica Porteros De Luz, Dewinton (CA)

(72) Inventor: Veronica Porteros De Luz, Dewinton (CA)

(21) Appl. No.: 18/100,449

(22) Filed: Jan. 23, 2023

Related U.S. Patent Documents

Reissue of:
(64) Patent No.: 10,953,275
Issued: Mar. 23, 2021
Appl. No.: 15/448,576
Filed: Mar. 2, 2017

U.S. Applications:
(63) Continuation-in-part of application No. 15/425,862, filed on Feb. 6, 2017, now Pat. No. 10,363,451, and
(Continued)

(51) Int. Cl.
*A63B 23/04* (2006.01)
*A63B 21/00* (2006.01)
(Continued)

(52) U.S. Cl.
CPC ..... *A63B 23/0482* (2013.01); *A63B 21/0628* (2015.10); *A63B 21/154* (2013.01);
(Continued)

(58) Field of Classification Search
CPC ..... A63B 23/0482
See application file for complete search history.

(56) References Cited

U.S. PATENT DOCUMENTS 3,682,475 A * 8/1972 Walker ..... A63B 23/0211 482/145
4,500,089 A * 2/1985 Jones ..... A63B 21/00072 482/100
(Continued)

FOREIGN PATENT DOCUMENTS

KR 10-1355242 B1 1/2014
WO 2008/077117 A1 6/2008
WO 2008077117 6/2008

OTHER PUBLICATIONS

"Booty Builder (Registered) The original hip thrust machine (Trademark) ( Norwegian )," published Jan. 30, 2014, https://youtu.be/FrcX2LjlwuA, by Booty Builder (Year: 2014).
(Continued)

*Primary Examiner* — Sarah B McPartlin
(74) *Attorney, Agent, or Firm* — Workman Nydegger

(57) ABSTRACT

A hip thrusting exercise machine is an apparatus that allows a user to safety perform a hip thrusting exercise in a controlled manner. The apparatus includes a backrest, an abdominal brace, a feet brace, an elongated frame, and a recoiling mechanism. The feet brace and the back rest allows the apparatus to properly hold the user's body in place while the user is performing the hip thrusting exercise. The abdominal brace is pressed against by the user's pelvic region in order to perform the hip thrusting exercise. The recoiling mechanism provides the user with physical resistance as the user pushes to raise the abdominal brace from a resting position to a vertically higher position. The coiling mechanism also returns the abdominal brace from the vertically higher position to the resting position so that the user can repeat the hip thrusting exercise.

21 Claims, 7 Drawing Sheets

AMENDED

Related U.S. Application Data a continuation-in-part of application No. PCT/IB2015/056672, filed on Sep. 2, 2015, said application No. 15/425,862 is a continuation-in-part of application No. PCT/IB2015/055922, filed on Aug. 4, 2015.

(60) Provisional application No. 62/044,865, filed on Sep. 2, 2014, provisional application No. 61/999,656, filed on Aug. 4, 2014.

(51) Int. Cl.

| | |
|---|---|
| ***A63B 21/062*** | (2006.01) |
| ***A63B 23/02*** | (2006.01) |
| ***A63B 69/00*** | (2006.01) |
| ***A63B 71/00*** | (2006.01) |

(52) U.S. Cl.

CPC ..... *A63B 21/159* (2013.01); *A63B 21/4029* (2015.10); *A63B 21/4047* (2015.10); *A63B 23/0222* (2013.01); *A63B 69/0062* (2020.08); *A63B 2071/009* (2013.01); *A63B 2208/0247* (2013.01); *A63B 2225/09* (2013.01); *A63B 2225/093* (2013.01)

(56) References Cited

U.S. PATENT DOCUMENTS 4,600,189 A * 7/1986 Olschansky ..... A63B 21/00072 482/100
4,625,962 A 12/1986 Street
4,861,021 A 8/1989 Edwards et al.
4,871,166 A * 10/1989 Sterba ..... A63B 23/00 482/142
4,893,812 A * 1/1990 Dawson, Jr. ..... A63B 21/154 482/94
5,147,267 A * 9/1992 Kunewalder ..... A63B 21/0004 482/142
5,350,346 A * 9/1994 Martinez ..... A63B 21/078 482/104
5,411,458 A * 5/1995 Giust ..... A63B 21/068 482/101
5,951,449 A 9/1999 Oppriecht
6,015,372 A * 1/2000 Steffee ..... A63B 21/155 452/100
6,059,701 A * 5/2000 George ..... A63B 23/0211 482/100
6,126,575 A 10/2000 Wang
6,354,982 B1 * 3/2002 Sencil ..... A63B 23/0233 482/134
6,450,923 B1 9/2002 Vatti
6,468,188 B1 * 10/2002 Koenig ..... A63B 21/0615 482/137
6,475,123 B1 * 11/2002 Evans ..... A63B 23/02 428/130
6,719,672 B1 * 4/2004 Ellis ..... A63B 21/155 482/98
6,896,643 B2 * 5/2005 Durfee, Jr. ..... A63B 23/0211 482/100
7,575,537 B2 8/2009 Ellis
8,007,409 B2 8/2011 Ellis
8,172,729 B2 5/2012 Ellis
8,172,736 B2 * 5/2012 Contreras ..... A63B 21/00047 482/140
8,187,155 B2 * 5/2012 Ooka ..... A63B 21/023 482/102
8,257,232 B2 9/2012 Albert
8,465,403 B2 * 6/2013 McCall, Jr. ..... A63B 23/0211 482/142
D685,867 S * 7/2013 Mehlman ..... A63B 21/4039 D21/690
8,790,222 B2 7/2014 Burger
10,363,451 B2 7/2019 Porteros De Luz
10,953,273 B2 3/2021 Porteros De Luz
10,953,275 B2 3/2021 Porteros De Luz
2002/0010056 A1 1/2002 Borsheim
2002/0022556 A1 * 2/2002 Eriksson ..... A63B 21/155 482/92
2002/0052268 A1 * 5/2002 Morcillo-Quintero ..... A63B 23/0211 482/92
2002/0128124 A1 * 9/2002 Mosimann ..... A63B 23/0222 482/92
2002/0173412 A1 * 11/2002 Stearns ..... A63B 21/055 482/123
2002/0193216 A1 * 12/2002 Wu ..... A63B 21/068 482/123
2003/0022771 A1 * 1/2003 Stearns ..... A63B 21/0615 482/142
2003/0060347 A1 * 3/2003 Tang ..... A63B 23/0222 482/141
2003/0211920 A1 * 11/2003 Mandel ..... A63B 21/015 482/116
2005/0124471 A1 6/2005 Wilkinson
2005/0143233 A1 * 6/2005 Shifferaw ..... A63B 21/023 482/140
2005/0239607 A1 10/2005 Chang
2006/0270531 A1 * 11/2006 Giannelli ..... A63B 21/155 482/94
2006/0281606 A1 12/2006 Radow
2007/0232463 A1 10/2007 Wu
2007/0270290 A1 * 11/2007 Mosimann ..... A63B 23/0222 482/100
2007/0287601 A1 12/2007 Burck et al.
2008/0167169 A1 * 7/2008 Giannelli ..... A63B 21/155 482/140
2009/0036274 A1 * 2/2009 Greene ..... A63B 22/203 482/57
2009/0176633 A1 * 7/2009 Dlugopolskiy .. A63B 23/03525 482/100
2009/0264265 A1 * 10/2009 Contreras ..... A63B 21/00047 482/99
2009/0270226 A1 10/2009 Watterson et al.
2010/0048364 A1 * 2/2010 Reyes ..... A63B 21/023 482/121
2010/0056345 A1 * 3/2010 Liu ..... A63B 21/152 482/98
2010/0113222 A1 5/2010 Radow
2010/0204021 A1 * 8/2010 Giannelli ..... A63B 21/155 482/94
2011/0039665 A1 * 2/2011 Dibble ..... A63B 21/045 482/92
2011/0039668 A1 * 2/2011 McCall, Jr. ..... A63B 21/4035 482/142
2011/0082011 A1 4/2011 Ellis
2011/0118090 A1 5/2011 Ellis
2011/0281691 A1 11/2011 Ellis
2011/0312474 A1 12/2011 Ellis
2012/0058870 A1 5/2012 Contreras
2012/0202654 A1 * 8/2012 Contreras ..... A63B 21/00047 482/94
2013/0184125 A1 7/2013 Maguire
2014/0087922 A1 3/2014 Bayerlein et al.
2015/0011370 A1 * 1/2015 Henniger ..... A63B 21/00047 482/145
2015/0038304 A1 * 2/2015 Davenport ..... A63B 21/4035 482/123
2015/0087484 A1 3/2015 Bayerlein et al.
2015/0352401 A1 12/2015 Johnson
2015/0367168 A1 * 12/2015 Henniger ..... A63B 23/0222 482/145
2016/0008650 A1 1/2016 Jue et al.
2016/0023049 A1 1/2016 Dalebout
2016/0045780 A1 * 2/2016 Henniger ..... A63B 23/0222 482/145
2016/0184629 A1 * 6/2016 Hornback ..... A63B 23/0482 482/98
2017/0144014 A1 5/2017 Porteros De Luz
2017/0239518 A1 8/2017 Porteros De Luz

(56) References Cited

U.S. PATENT DOCUMENTS

| | | | | |
|---|---|---|---|---|
| 2018/0001131 | A1* | 1/2018 | Nevarez, Jr. ..... | A63B 21/4033 |
| 2018/0214732 | A1* | 8/2018 | Nevarez ..... | A63B 21/4033 |
| 2019/0336818 | A1 | 11/2019 | Porteros De Luz | |

OTHER PUBLICATIONS

International Search Report dated Oct. 30, 2015 for International Application No. PCT/IB2015/055922 filed Aug. 4, 2015.
Notice of Allowance received for U.S. Appl. No. 15/448,576, mailed on Dec. 4, 2020, 9 pages.
"Hip Thrusts Using Leg Extension Machine" by Lean Bodies Consulting, Oct. 16, 2013, YouTube video: https://youtu.be/us42gs1q_m8 (Year: 2013).*
"Booty Builder® The original hip thrust machine™ ( Norwegian )," published Jan. 30, 2014, https://youtu.be/FrcX2LjiwuA, By Booty Builder (Year: 2014).*
"Machine Glute Bridge," published Aug. 20, 2014, https://youtu.be/N3PYJjFkodM, by Sci-Unison Fitness (Year: 2014).*
"Weighted Smith Machine Glute Bridge," published Apr. 6, 2014, https://youtu.be/TPuwKUch9Lw, By Jeremy Reid (Year: 2014).*
"Band Skorcher Hip Thrust," published Jan. 12, 2010, https://youtu.be/S4zUpSj-3nA, by Bret Contreras (Year: 2010).*

* cited by examiner

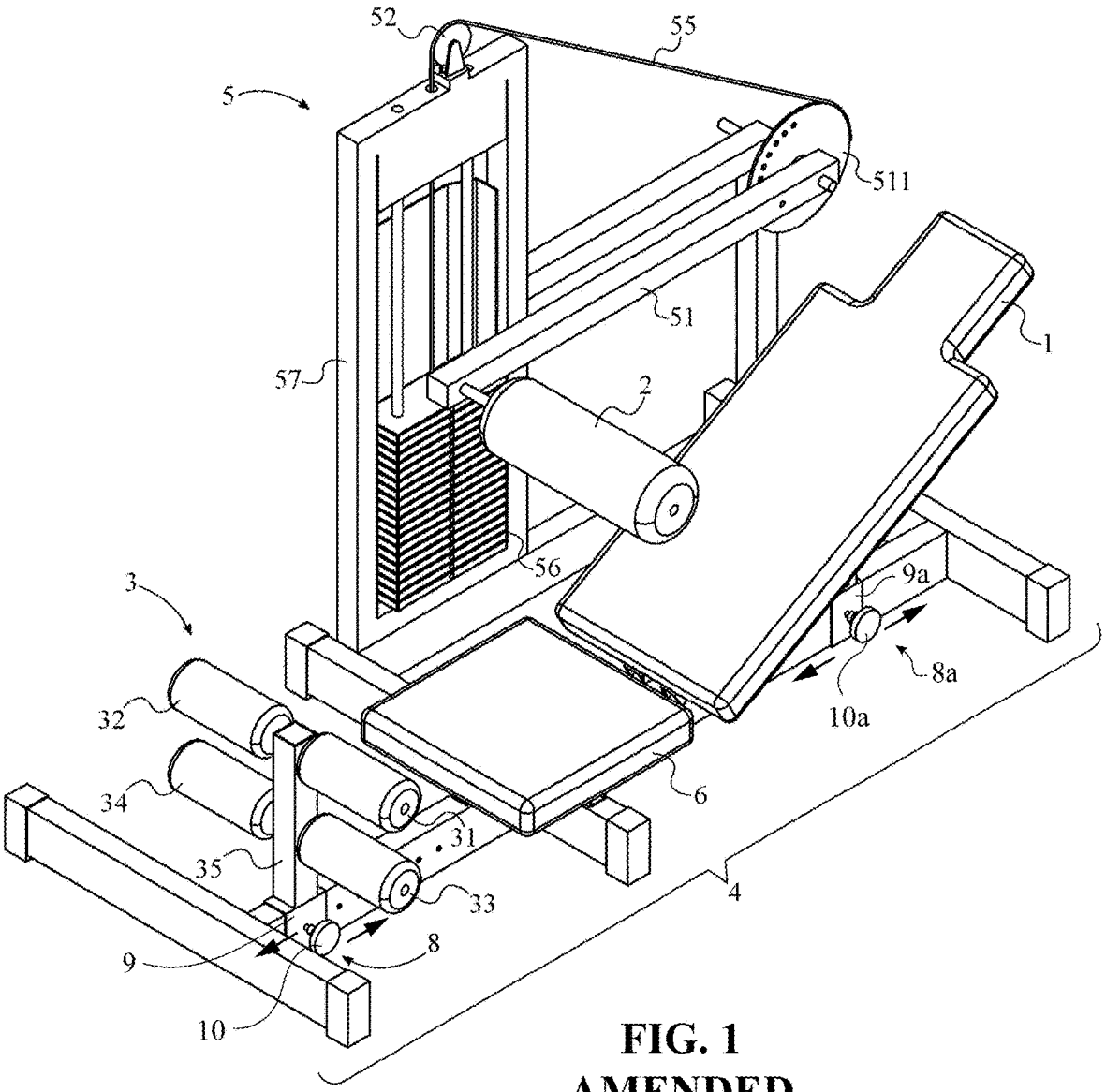
FIG. 1
AMENDED

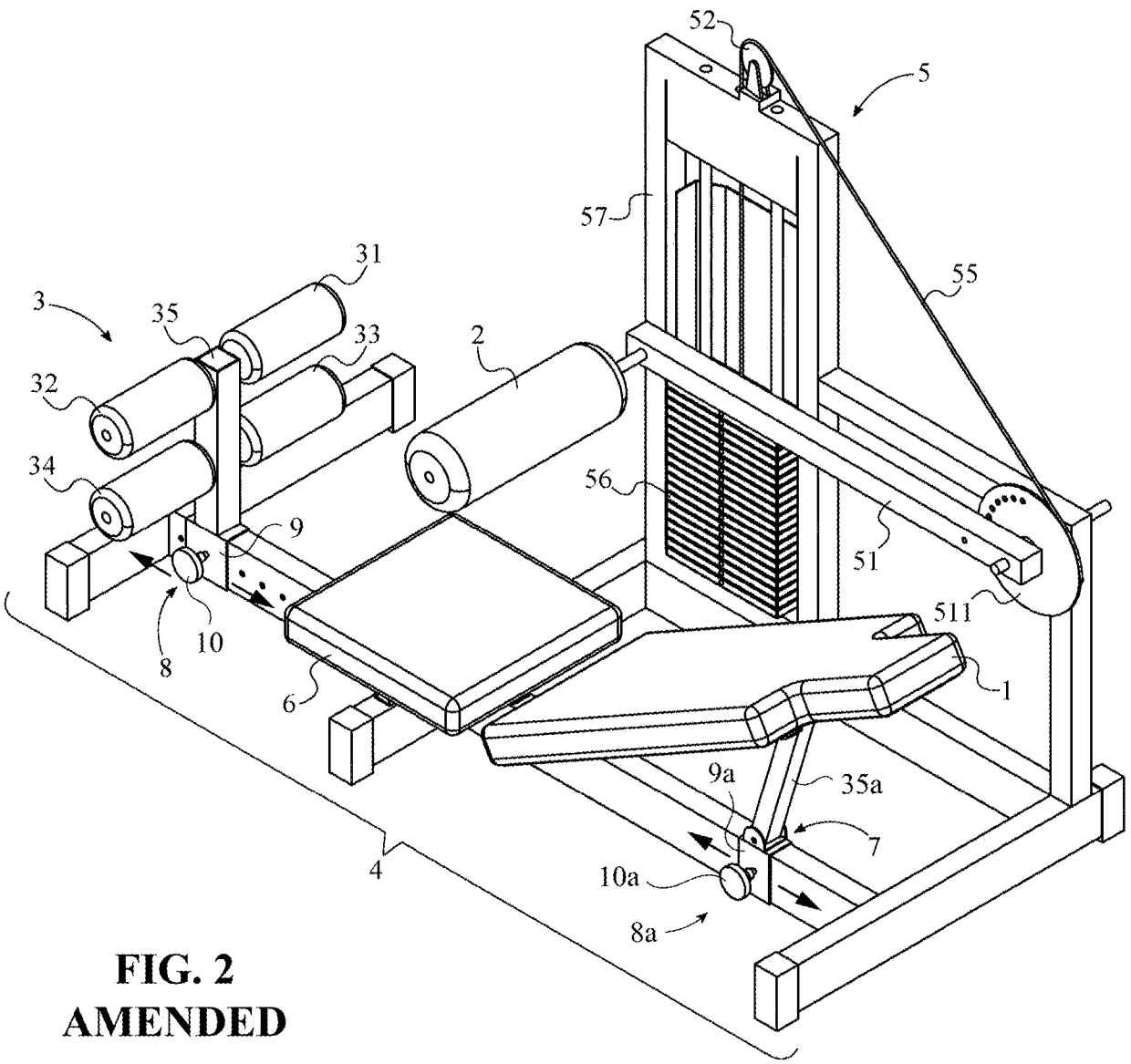
FIG. 2
AMENDED

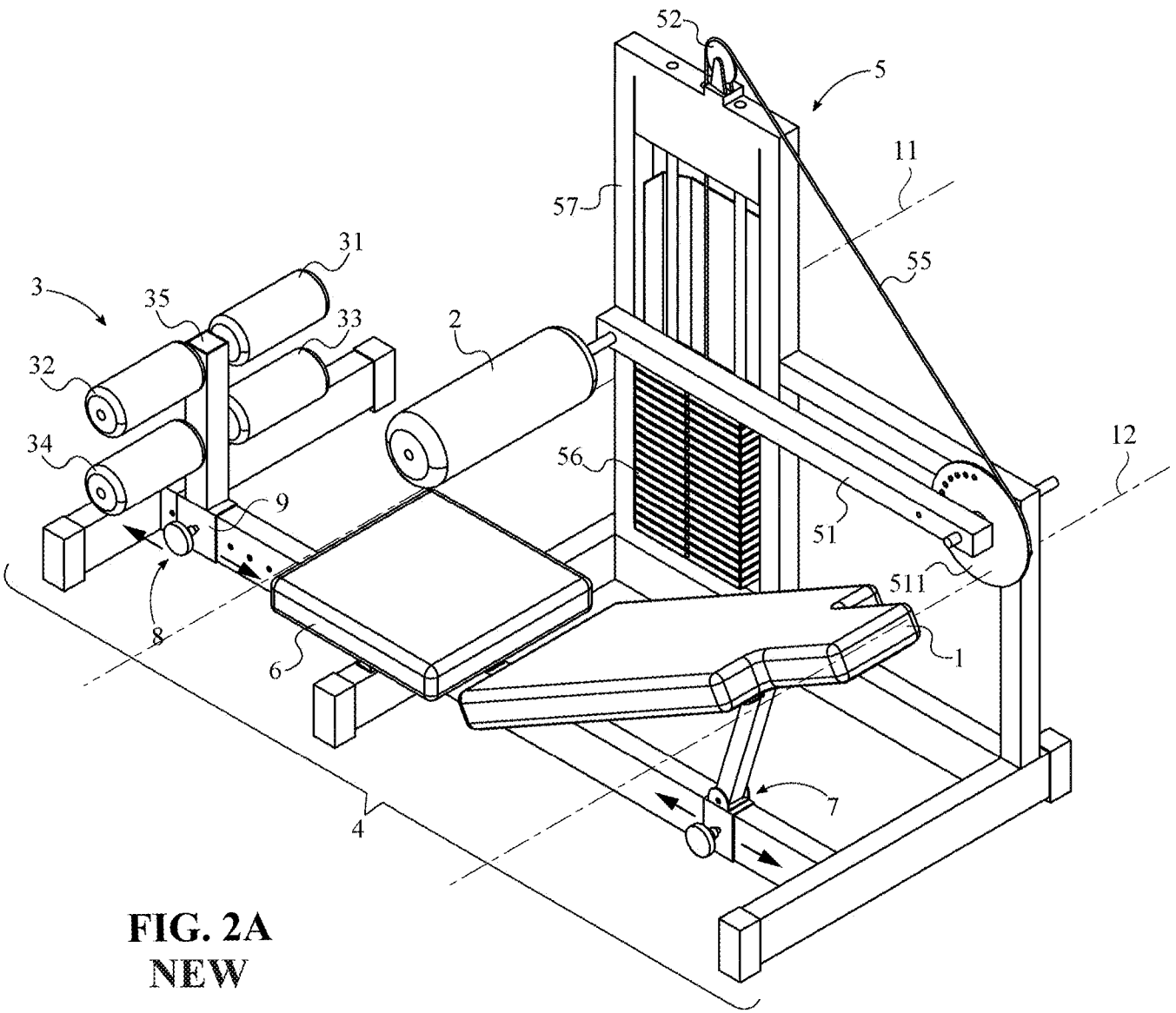
FIG. 2A
NEW

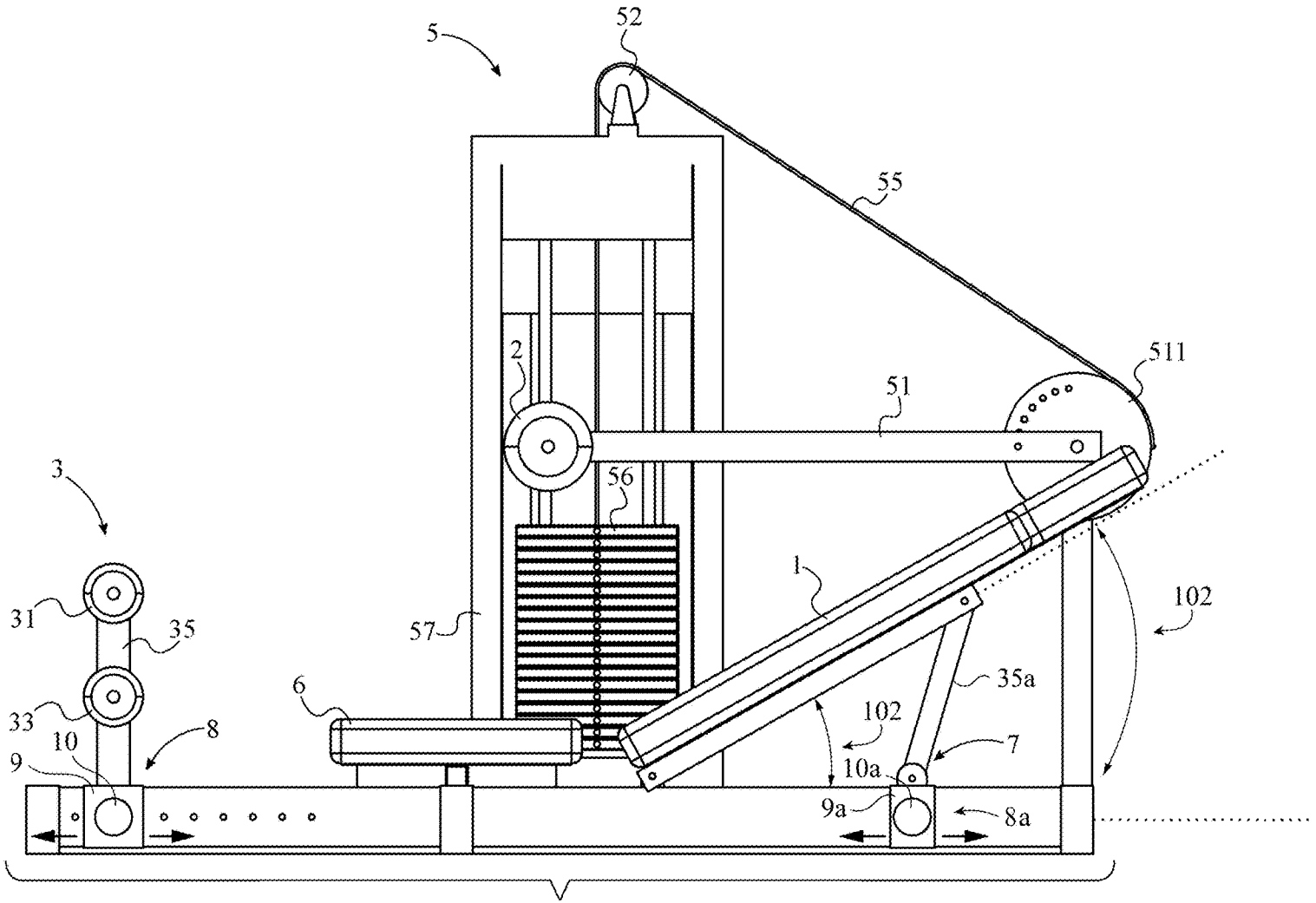
FIG. 3
AMENDED

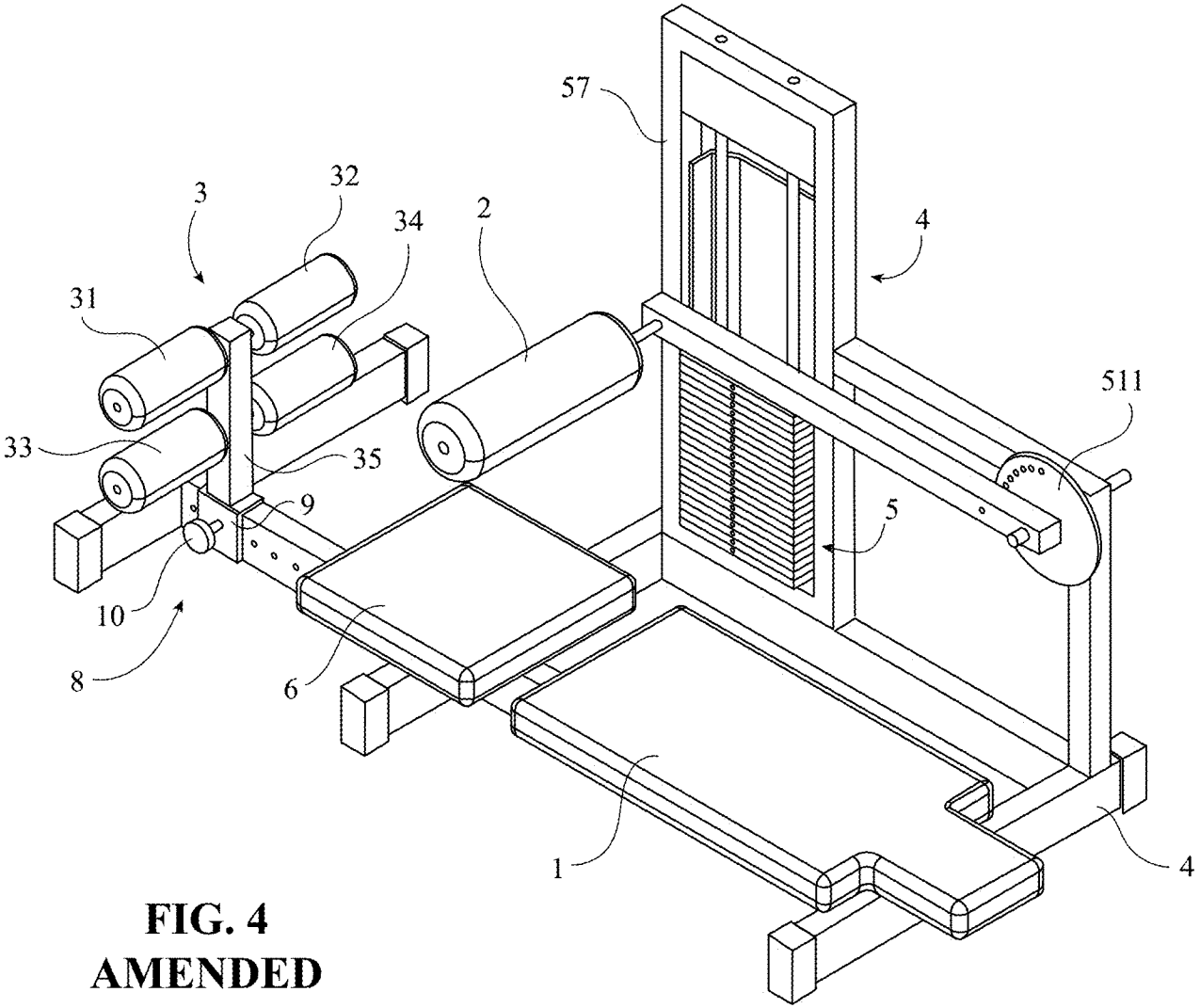
FIG. 4
AMENDED

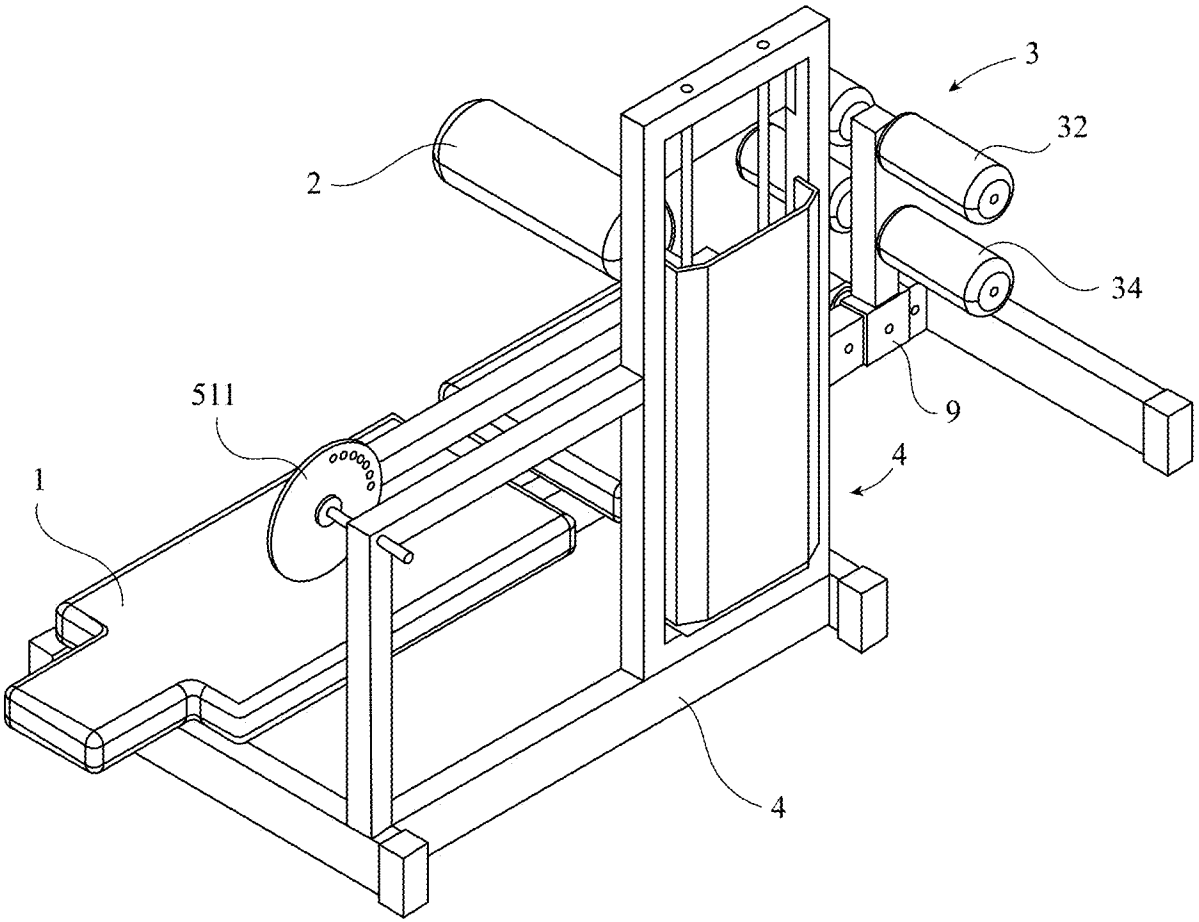
FIG. 5
AMENDED

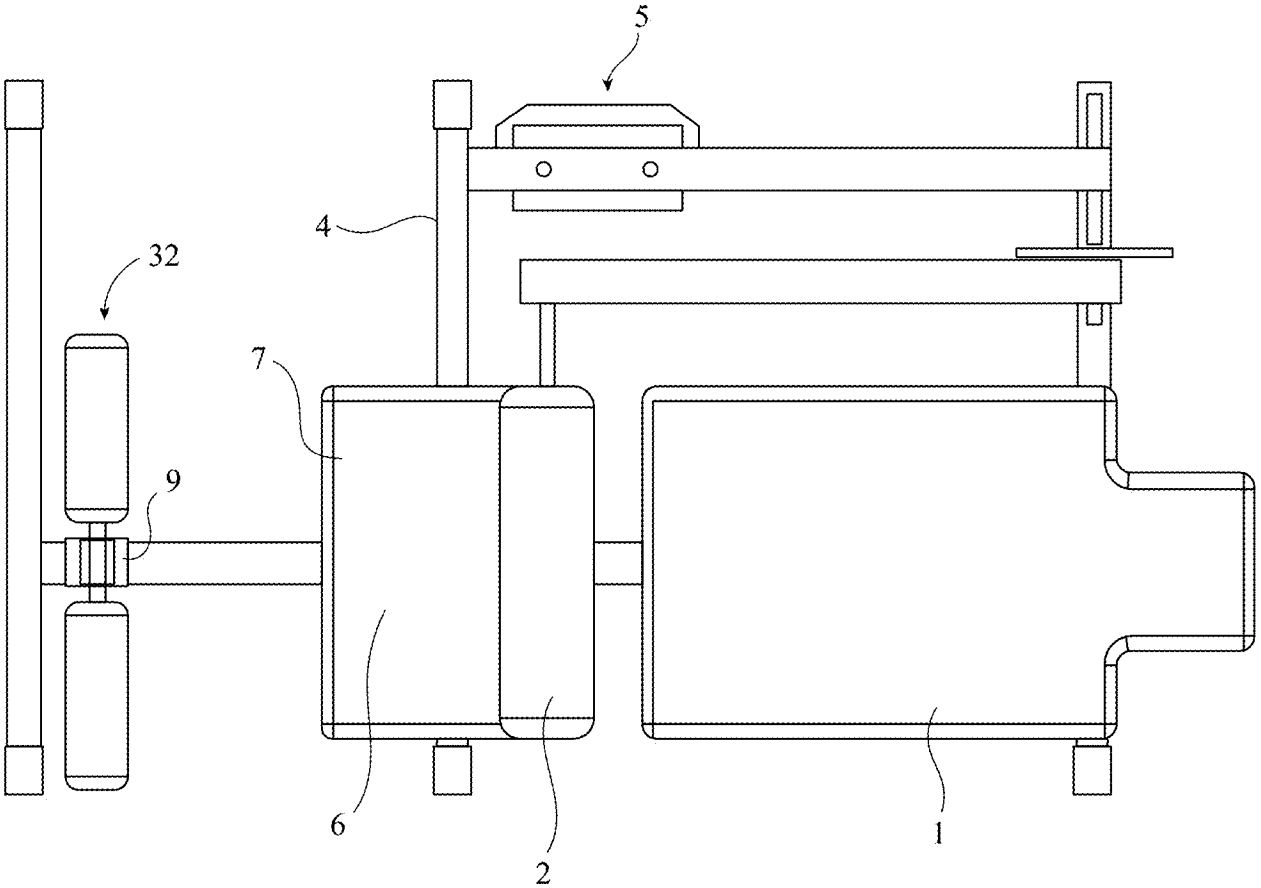
FIG. 6
AMENDED

HIP THRUSTING EXERCISE MACHINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

[The current application is a continuation-in-part of the PCT application PCT/IB2015/056672 filed on Sep. 2, 2015,] *The present invention is a broadening reissue of U.S. Pat. No. 10,953,275, ('275 patent) entitled "HIP THRUSTING EXERCISE MACHINE," filed on Mar. 2, 2017, which is a continuation-in-part of PCT/IB2015/056672, filed Sep. 2, 2015, and* which claims priority to U.S. Provisional Patent application 62/044,865 filed on Sep. 2, 2014. *The '275 patent is also a continuation-in-part of U.S. Pat. No. 10,363,451, filed Feb. 26, 2017, which is a continuation-in-part of PCT/IB2015/055922, which claims priority to U.S. Provisional Application No. 61/999,656 filed Aug. 4, 2014.*

FIELD OF THE INVENTION

The present invention generally relates to an exercise apparatus that enables a user to perform hip strengthening exercises in a horizontal position while minimizing the risk of injury. More specifically, the present invention facilitates hip thrust exercises that work the gluteal muscles.

BACKGROUND OF THE INVENTION

Hip thrusts are usually a free weight exercise that is performed without the assistance of a machine. A common method for performing a hip thrust begins with a person reclining horizontally on a bench, balancing a weight on their hips, and pushing the weight upwards (i.e. in a vertical direction) with the hips. There is a danger of the weight falling off the person or the person not being able to sustain the weight, resulting in the person falling back to the bench and the weight injuring their body. Additionally, there can be certain discomfort when performing variations associate with either the bar or the bench. The bar can be difficult to manage and bigger (and thus heavier) plates may be needed to provide sufficient clearance for a person to position their hips below the bar.

The present invention provides a novel solution to these problems by providing a means to stop weights from injuring a person during hip thrust exercises. The present invention has built-in mechanical checks that prevent the weight from falling off the person doing the exercises and stops the weight from impacting and injuring the hips or abdomen. The present invention allows a user to do hip and gluteal muscle-strengthening exercises in a horizontal position without risking serious injury, which is important because injury due to the improper positioning of a barbell can seriously damage one's back.

BRIEF DESCRIPTION OF THE DRAWINGS

FIG. 1 is a front perspective view of the present invention illustrating a first embodiment of the recoiling mechanism.

FIG. 2 is a rear perspective view of the present invention illustrating the first embodiment of the recoiling mechanism.

FIG. 3 is a side view of the present invention illustrating the first embodiment of the recoiling mechanism.

FIG. 4 is a front perspective view of the present invention illustrating a second embodiment of the recoiling mechanism.

FIG. 5 is a rear perspective view of the present invention illustrating the second embodiment of the recoiling mechanism.

FIG. 6 is a side view of the present invention illustrating the second embodiment of the recoiling mechanism.

DETAILED DESCRIPTION OF THE INVENTION

All illustrations of the drawings are for the purpose of describing selected versions of the present invention and are not intended to limit the scope of the present invention.

As can be seen in FIG. 1 through 6, the present invention is a hip thrusting exercise machine that allows a user to perform the hip thrusting exercise in a more controlled manner. The present invention can be used to condition the gluteus maximus, hamstrings, and hip stabilizing muscles without risking injury due to the weight falling on the hips, abdomen, or on to the floor. The present invention comprises a backrest 1, an abdominal brace 2, a feet brace 3, an elongated frame 4, and a recoiling mechanism 5. The elongated frame 4 is the structural base of the present invention and allows the other components of the present invention to be connected together. The feet brace 3 is used to fix the user's feet at one location on the present invention, while the backrest 1 is used to press the user's back against the present invention. Furthermore, the feet brace 3 and the backrest 1 allow the user to be situated in a supine posture while performing the hip thrusting exercise with the present invention. In order to perform the hip thrusting exercise, the user presses their pelvic region against the abdominal brace 2 in order to lift the abdominal brace 2 from a resting position to a vertically higher position. The abdominal brace 2 is typically oriented perpendicular to the user's height. The recoiling mechanism 5 is used to provide the user with physical resistance as the user moves the abdominal brace 2 from the resting position to the vertically higher position during the hip thrusting exercise. The recoiling mechanism 5 is also used to return the abdominal brace 2 from the vertically higher position to the resting position so that the user can repeat the hip thrusting exercise with the present invention. The recoiling mechanism 5 preferably utilizes some kind of weights to resist the movement of the abdominal brace 2 from its resting position. However, the recoiling mechanism 5 could utilize some kind of spring system as well.

The general configuration of these components allows the user to efficiently and effectively perform the hip thrusting exercise with the present invention. Thus, the backrest 1 is terminally mounted to the elongated frame 4, and the feet brace 3 is laterally mounted to the elongated frame 4, offset from the backrest 1. This configuration between the feet brace 3, the backrest 1, and the elongated frame 4 allows the user to align the height of their body along the length of the present invention as the user is situated in a supine posture on the present invention. The abdominal brace 2 is positioned in between the backrest 1 and the feet brace 3 so that the abdominal brace 2 is anatomically aligned to engage the user's pelvis. The abdominal brace 2 is also positioned offset from the elongated frame 4, which allows the user to fit their body in between the abdominal brace 2 and the elongated frame 4. Moreover, the abdominal brace 2 is operatively coupled to the elongated frame 4 by the recoiling mechanism 5 so that the recoiling mechanism 5 is able to recoil an offsetting movement made by the abdominal brace 2 away from the elongated frame 4. As mentioned before, the offsetting movement is the movement of the abdominal brace 2 from the resting position to the vertically higher position. The recoiling mechanism 5 can be designed in a variety of configurations to accommodate the functionality of the present invention. However, two embodiments of the recoiling mechanism 5 are described hereinafter. As can be seen in FIG. 1 through 3, the first embodiment of the recoiling mechanism 5 comprises a lever 51, at least one pulley 52, a cable 55, and a weight stack 56. The lever 51 is used to guide the movement of the abdominal brace 2. The lever 51 also allows the present invention to convert the linear motion of the abdominal brace 2 during the hip thrusting exercise into rotational motion about a fulcrum 511 of the lever 51. Thus, the abdominal brace 2 needs to be terminally mounted to the lever 51, and the fulcrum 511 of the lever 51 needs to be pivotably mounted to the elongated frame 4, offset from the abdominal brace 2. This configuration between the lever 51, the abdominal brace 2, and the elongated frame 4 allows the user to apply the mechanical leverage that is required to lift the weight stack 56 during the hip thrusting exercise. Moreover, the cable 55 and at least one pulley 52 are used to convert the rotational motion about the fulcrum 511 of lever 51 into linear motion that is needed to lift the weight stack 56. Consequently, the at least one pulley 52 is rotatably mounted to the elongated frame 4, and the cable 55 is tensionably engaged to the at least one pulley 52 so that the linear motion of lifting the weight stack 56 is able to simultaneously occur with the linear motion of the abdominal brace 2. In addition, the weight stack 56 can be incrementally increased or decreased in weight according the user's preferences on how much resistance should be applied to the abdominal brace 2 in order to perform the hip thrusting exercise. The weight stack 56 needs to be torsionally tethered about the fulcrum 511 of the lever 51 by the cable 55 so that the rotational motion of the fulcrum 511 allows the cable 55 to pull the weight stack 56 in an upward direction.

*By way of further explanation, at least FIGS. 1-5 show that weight stack 56 may be positioned between the backrest 1 and feet brace 3, albeit laterally offset. The term "laterally offset," may refer to a position disposed away from the backrest 1 and/or seat 6 in a direction that is generally perpendicular to a line extending through the backrest 1, seat 6, and feet brace 3 (i.e., generally perpendicular to the orientation of the frame 4). Along these lines, FIGS. 2 and 2A further show how the weight stack 56 is positioned in this matter. The weight stack may be disposed between two end planes (not shown)—a first end plane and a second end plane—that each contain one of reference lines 11 and 12, respectively. The reference lines 11 and 12 may extend perpendicularly to the orientation of the frame 4 and may delineate the distal ends of the seat 6 and backrest 1, respectively, each distal end of the seat 6 and backrest 1 being defined as points of the seat 6 and backrest 1 that extend furthest from a middle point located between the seat 6 and backrest 1. Reference line 11 may extend along the first plane, the first plane delineating the distal end of the seat 6 and extending vertically (i.e., perpendicularly to a floor on which the frame 4 rests) downward through the frame 4. Reference line 12 may extend along the second plane, the second plane delineating the distal end of the backrest 1 and extending vertically downward through the frame 4.*

*For example, FIG. 2A shows reference lines 11 and 12, which are perpendicular to the orientation of the frame, and/or to the overall position of the back rest 1 and seat 6. The reference lines 11 and 12, which extend along the first and second end planes (or distal ends) of the seat 6 and backrest 1, respectively. As shown in FIG. 2A, the reference lines 11 and 12 may delineate the limits between which the weight stack 56 is positioned. Thus, although the weight stack 56 may be laterally offset from the seat 6 and backrest 1, the weight stack 56 may nevertheless be positioned laterally between a distal end of the seat 6 and a distal end of the backrest 1, and hence between the seat 6 and backrest 1. Similarly, the Figures also show that the weight stack 56 may be positioned laterally offset from and between the backrest 1 and feet brace 3.*

As can be seen in FIG. 4 through 6, the second embodiment of the recoiling mechanism 5 comprises a track 53, an even number of pulleys 54, a cable 55, and a weight stack 56. The track 53 is used to guide the movement of the abdominal brace 2. The track 53 is mounted onto the elongated frame 4 at a lifting angle 101, and the abdominal brace 2 is slidably connected along the track 53, which allows the track 53 to remain fixed at the lifting angle 101 as the abdominal brace 2 is moved by the user. The lifting angle 101 is preferably 90 degrees between the track 53 and the elongated frame 4 in order to optimize the user's workout on the present invention. Moreover, each of the even number of pulleys 54 is rotatably mounted to the elongated frame 4, and the cable 55 is tensionably engaged to each of the even number of pulleys 54. This allows the weight stack 56 to be tethered to the abdominal brace 2 by the cable 55. The second embodiment of recoiling mechanism 5 needs the even number of pulleys 54 because an even number of pulleys allows the tension felt at opposite ends of the cable 55 to be in the same direction. Consequently, the weight stack 56 is pulled in an upward direction by the cable 55 as the abdominal brace 2 pulls on the cable 55 in the same upward direction.

In both the first embodiment and the second embodiment of the present invention, the recoiling mechanism 5 further comprises a protective structure 57, which houses the weight stack 56, which are shown in FIG. 1 through 6. The protective structure 57 is used to prevent injuries to the user or other nearby individuals from the linear motion of the weight stack 56. Also both the first embodiment and the second embodiment of the present invention, the recoiling mechanism 5 may optionally comprise a pulley enclosure in order either to house the at least one pulley 52 from the first embodiment of the recoiling mechanism 5 or to house the even number of pulleys 54 from the second embodiment of the recoiling mechanism 5.

As can be seen in FIG. 1 through 6, the present invention may further comprise a seat 6, which would allow the user to rest their buttocks against the seat 6 while the abdominal brace 2 is in the resting position. The seat 6 needs to be positioned in between the abdominal brace 2 and the elongated frame 4 and needs to be mounted adjacent to the elongated frame 4. This configuration of the seat 6 allows the user to be conformably situated in the supine posture while resting on the present invention.

The feet brace 3 needs to be able to secure the user's feet at one location on the present invention. In the preferred embodiment of the present invention, the feet brace 3 comprises a first left support 31, a first right support 32, a second left support 33, a second right support 34, and a structural post 35, which are shown in FIG. 1 through 6. The first left support 31 and the second left support 33 are used to secure the user's left foot. Similarly, the first right support 32 and the second right support 34 are used to secure the user's right foot. The structural post 35 is used as a stem to arrange the first left support 31, the first right support 32, the second left support 33, and the second right support 34 on the elongated frame 4. Thus, the first left support 31, the first right support 32, the second left support 33, and the second right support 34 are laterally connected to the structural post 35, which is mounted adjacent to the elongated frame 4. Moreover, the first left support 31 and the second left support 33 are positioned offset from each other along the structural post 35 so that the user can fit their left foot in between the first left support 31 and the second left support 33. Likewise, the first right support 32 and the second right support 34 are positioned offset from each other along the structural post 35 so that user can fit their right foot in between the first right support 32 and the second right support 34. In addition, the first left support 31 and the first right support 32 are positioned opposite to each other about the structural post 35, and the second left support 33 and the second right support 34 are positioned opposite to each other about the structural post 35. This allows the gap formed between the first left support 31 and the second left support 33 and the gap formed between the first right support 32 and the second right support 34 to be aligned with each other so that user is able to comfortably rest their left and right feet within the feet brace 3.

In order to the present invention to be more comfortable while the user is performing the hip thrusting exercise, some components need to be configured as a rotatable padded body with a cylindrical shape, which is shown in FIG. 1 through 6. The abdominal brace 2 is one component that would benefit the user by being a rotatable padded body with a cylindrical shape because the user would be able to dynamically adjust their pelvis while pressing against the abdominal brace 2 without hurting themselves. In addition, the first left support 31, the first right support 32, the second left support 33, and the second right support 34 are components that would benefit the user by being a rotatable padded body with a cylindrical shape because the user would be able to comfortably fit either their left foot in between the first left support 31 and the second left support 33 or their right foot in between the first right support 32 and the second right support 34 without hurting themselves.

The present invention can be adjusted in a variety of ways in order to accommodate a user's unique metrics or a user's unique movements during the hip thrusting exercise. As can be seen in FIGS. 2, 3, 5, and 6, an incline adjustment mechanism 7 *comprises a structural post 35a that* is operatively integrated between the backrest 1 and the elongated frame 4 *via a positional adjustment mechanism 8a,* and is used to adjust the incline angle 102 between the backrest 1 and the elongated frame 4. The *positional adjustment mechanism 8a comprises a sleeve 9a that rotatably holds the structural post 35a about the elongated frame 8a, the sleeve 9a being slidably mounted about the elongated frame 4. Thus, slidable re-positioning of the sleeve 9a along frame 4 results in adjustment of incline angle 102 of the backrest 1 relative to the frame 4. The sleeve 9a may be set at various points along the frame 4 via a locking pin 10a, and the* incline angle 102 could preferably adjust to be any angle less than 90 degrees. The incline adjustment mechanism 7 allows the user to adjust how flat he/she wants lie on the present invention while performing the hip thrusting exercise *by adjusting the relative position of the sleeve 9a along the elongated frame 4*. The incline adjustment mechanism 7 is preferably a [length-adjustable] *position-adjustable* counterfort that is mounted in between the backrest 1 and the elongated frame 4. Moreover, a positional adjustment mechanism 8 is operatively integrated between the feet brace 3 and the elongated frame 4 and is used to adjust a position of the feet brace 3 along the elongated frame 4. As can be seen in FIG. 1 through 6, the positional adjustment mechanism 8 allows the user to adjust the present invention according their own height so that a taller person would be able to move the feet brace 3 further from the backrest 1 and a shorter person would be able to move the feet brace 3 closer to the backrest 1. The positional adjustment mechanism 8 is preferably the feet brace 3 being laterally connected *to* a sleeve *9*, which is slidably mounted about the elongated frame 4 and is held in place along the elongated frame 4 with a locking pin *10*.

Although the invention has been explained in relation to its preferred embodiment, it is to be understood that many other possible modifications and variations can be made without departing from the spirit and scope of the invention as hereinafter claimed.

What is claimed is:

1. A hip thrusting exercise machine comprising:

a backrest;

an abdominal brace;

a feet brace;

a frame;

a weight;

a seat;

the backrest being mounted to the frame and the backrest being pivotable;

the feet brace being mounted to the frame, offset from the backrest;

the abdominal brace being positioned away from the feet brace;

the abdominal brace being positioned offset from the frame;

the seat being positioned between the abdominal brace and the frame;

the seat being mounted adjacent to the frame;

the weight being positioned *laterally offset from the backrest and seat* between *a distal end of* the backrest and *a distal end of* the seat; and the weight being used to recoil an offsetting movement of the abdominal brace from a resting position to a vertically higher position *as a result of a user's hip pressing the abdominal brace upward* during a hip thrusting exercise.

2. The hip thrusting exercise machine as claimed in claim 1 comprising:

a recoiling mechanism;

the abdominal brace being operatively coupled to the frame by the recoiling mechanism;

the recoiling mechanism being used to recoil the offsetting movement;

the recoiling mechanism comprising a lever, at least one pulley, a cable and the weight;

the abdominal brace being terminally mounted to the lever; a fulcrum of the lever being pivotably mounted to the frame, offset from the abdominal brace; and the at least one pulley being rotatably mounted to the frame;

the cable being tensionably engaged to the at least one pulley; and the weight being torsionally tethered about the fulcrum of the lever by the cable.

3. The hip thrusting exercise machine as claimed in claim 2 comprising:

the recoiling mechanism comprising a protective structure; and the weight being housed within the protective structure.

[4. The hip thrusting exercise machine as claimed in claim 1 comprising:

a recoiling mechanism;

the abdominal brace being operatively coupled to the frame by the recoiling mechanism;

the recoiling mechanism being used to recoil the offsetting movement;

the recoiling mechanism comprising a track, an even number of pulleys, a cable and the weight;

the track being mounted onto the track at a lifting angle;

the abdominal brace being slidably connected along the track;

each of the even number of pulleys being rotatably mounted to the frame;

the cable being tensionably engaged to each of the even number of pulleys; and the weight being tethered to the abdominal brace by the cable.]

[5. The hip thrusting exercise machine as claimed in claim 4 comprising:

the recoiling mechanism comprising a protective structure; and the weight being housed within the protective structure.]

6. The hip thrusting exercise machine as claimed in claim 1 comprising:

the abdominal brace being a rotatable padded body with a cylindrical shape.

7. The hip thrusting exercise machine as claimed in claim 1 wherein the feet brace comprises:

the feet brace comprising a structural post mounted to the frame, a first left support, a first right support, a second left support, and a second right support each laterally connected to the structural post, the first left support and the first right support being positioned opposite to each other about the structural post, the second left support and the second right support being positioned opposite to each other about the structural post, the first left support and the second left support being positioned offset from each other along the structural post such that the first left support and the second left support are configured to receive a left foot of a user therebetween, and the first right support and the second right support being positioned offset from each other along the structural post such that the first right support and the second right support are configured to receive a right foot of the user therebetween.

8. The hip thrusting exercise machine as claimed in claim 7 comprising:

the first left support, the first right support, the second left support and the second right support each being a rotatable padded body with a cylindrical shape.

9. The hip thrusting exercise machine as claimed in claim 1 comprising:

an incline adjustment mechanism; and the incline adjustment mechanism being operatively integrated between the backrest and the frame, wherein the incline adjustment mechanism is used to adjust an incline angle between the backrest and the frame.

10. The hip thrusting exercise machine as claimed in claim 1 comprising:

a positional adjustment mechanism; and the positional adjustment mechanism being operatively integrated between the feet brace and the frame, wherein the positional adjustment mechanism is used to adjust a position of the feet brace along the frame.

11. The hip thrusting exercise machine as claimed in claim 1 wherein the backrest is adjustable to a supine position.

12. The hip thrusting exercise machine as claimed in claim 1 wherein the backrest is pivotable *with respect to the frame via the incline adjustment mechanism*.

13. A hip thrusting exercise machine comprising:

a backrest;

an abdominal brace;

a feet brace;

a frame;

a weight *stack*;

a seat mounted to the frame, the seat positioned horizontally *relative to a floor disposed beneath the hip thrusting exercise machine*;

the backrest being mounted to the frame;

the feet brace being mounted to the frame, offset from the backrest;

the abdominal brace being positioned away from the feet brace;

the abdominal brace being positioned offset from the frame;

the abdominal brace being a rotatable padded body with a cylindrical shape; and the weight *stack* being used to recoil an offsetting movement of the abdominal brace from a resting position to a vertically higher position *as a result of a user's hip pressing the abdominal brace upward* during a hip thrusting exercise.

*14. The hip thrusting exercise machine as claimed in claim 1, wherein the feet brace further comprise:*

*first and second left supports and first and second right supports;*

*wherein a user is able to rest the user's feet within a gap between the corresponding first and second right or left supports.*

*15. The hip thrusting exercise machine as claimed in claim 13, further comprising:*

*a recoiling mechanism comprising: a lever, at least one pulley, a cable, and a protective enclosure that houses the weight stack;*

*wherein the recoiling mechanism operatively couples the abdominal brace to the frame, such that the weight stack moves upward and downward within the protective structure in response to the offsetting movement applied to the abdominal brace.*

*16. The hip thrusting exercise machine as recited in claim 15, wherein:*

*the abdominal brace is terminally mounted to the lever;*

*a fulcrum of the lever is pivotably mounted to the frame, offset from the abdominal brace; and*

*the at least one pulley is rotatably mounted to the frame;*

*the cable is tensionably engaged to the at least one pulley; and*

*the weight stack is torsionally tethered about the fulcrum of the lever by the cable.*

*17. The hip thrusting exercise machine as recited in claim 13, wherein the feet brace comprises:*

*first and second left supports and first and second right supports;*

*wherein a user is able to rest the user's feet within a gap between the corresponding first and second right or left supports.*

*18. The hip thrusting exercise machine as recited in claim 17, further comprising:*

*the first left support, the first right support, the second left support and the second right support each comprising a rotatable padded body with a cylindrical shape.*

*19. The hip thrusting exercise machine as recited in claim 13, further comprising:*

*an incline adjustment mechanism for adjusting an incline angle of the backrest relative to the frame;*

*wherein positional adjustment of a structural post between the backrest and the frame causes adjustment of the incline angle of the backrest.*

*20. The hip thrusting exercise machine as recited in claim 13, comprising:*

*a positional adjustment mechanism; and*

*the positional adjustment mechanism being operatively integrated between the feet brace and the frame, wherein the positional adjustment mechanism is used to adjust a position of the feet brace along the frame.*

*21. The hip thrusting exercise machine as recited in claim 13, wherein the backrest is adjustable via an incline adjustment mechanism to a supine position.*

*22. The hip thrusting exercise machine as recited in claim 1, wherein the feet brace is positioned above a level of the seat.*

*23. The hip thrusting exercise machine as recited in claim 1, wherein the feet brace is slidably mounted to the frame, the position of the feet brace being horizontally adjustable along the frame at a plurality of positions.*

* * * * *